United States Patent
Phillips et al.

(10) Patent No.: US 7,814,543 B2
(45) Date of Patent: Oct. 12, 2010

(54) SYSTEM AND METHOD FOR SECURING A COMPUTER SYSTEM CONNECTED TO A NETWORK FROM ATTACKS

(75) Inventors: Thomas G Phillips, Bellevue, WA (US); Alexander Frank, Bellevue, WA (US); Adrian M Chandley, Sammamish, WA (US); Christopher A Schoppa, Redmond, WA (US); William J Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1063 days.

(21) Appl. No.: 10/880,049

(22) Filed: Jun. 29, 2004

(65) Prior Publication Data

US 2005/0182949 A1    Aug. 18, 2005

Related U.S. Application Data

(60) Provisional application No. 60/544,783, filed on Feb. 13, 2004.

(51) Int. Cl.
*G06F 11/00* (2006.01)
(52) U.S. Cl. .............................. 726/22; 726/1; 713/100
(58) Field of Classification Search .................. 726/22, 726/23, 24, 25, 11
See application file for complete search history.

(56) References Cited

U.S. PATENT DOCUMENTS

| | | |
|---|---|---|
| 5,359,659 A | 10/1994 | Rosenthal |
| 5,898,842 A | 4/1999 | Hakimi |
| 5,966,448 A | 10/1999 | Namba et al. |
| 5,987,134 A | 11/1999 | Shin et al. |
| 5,987,376 A | 11/1999 | Olson et al. |
| 6,088,805 A | 7/2000 | Davis et al. |
| 6,128,738 A | 10/2000 | Doyle et al. |
| 6,233,606 B1 | 5/2001 | Dujari |
| 6,243,815 B1 | 6/2001 | Antur et al. |
| 6,269,099 B1 | 7/2001 | Borella et al. |
| 6,279,110 B1 | 8/2001 | Johnson et al. |
| 6,308,266 B1 | 10/2001 | Freeman |

(Continued)

FOREIGN PATENT DOCUMENTS

EP    1 248 441 A2    9/2002

(Continued)

OTHER PUBLICATIONS

Hunt, R., "Internet/Intranet Firewall Security—Policy, Architecture and Transaction Services," *Computer Communications* 21(13):1107-1123, Sep. 1998.

(Continued)

*Primary Examiner*—Jung Kim
*Assistant Examiner*—Samson B Lemma
(74) *Attorney, Agent, or Firm*—Wolf, Greenfield & Sacks, P.C.

(57) ABSTRACT

A network security system for protecting computing devices connected to a communication network from identified security threats is presented. A security service published security information intended for network security modules in the communication network. A network security module is interposed, either logically or physically, between a computer and the communication network. The security information comprises security measures which, when implemented by a network security module, protect the corresponding computer from an identified security threat to the computer.

25 Claims, 11 Drawing Sheets

U.S. PATENT DOCUMENTS

| | | | |
|---|---|---|---|
| 6,327,652 | B1 | 12/2001 | England et al. |
| 6,341,349 | B1 | 1/2002 | Takagiri et al. |
| 6,367,009 | B1 | 4/2002 | Davis et al. |
| 6,397,303 | B1 | 5/2002 | Arimilli et al. |
| 6,405,290 | B1 | 6/2002 | Arimilli et al. |
| 6,424,718 | B1 | 7/2002 | Holloway |
| 6,484,315 | B1 | 11/2002 | Ziese |
| 6,782,294 | B2 | 8/2004 | Reich et al. |
| 6,832,321 | B1 * | 12/2004 | Barrett ........................ 726/11 |
| 6,938,166 | B1 | 8/2005 | Safarti et al. |
| 6,941,366 | B2 | 9/2005 | Antes et al. |
| 6,941,384 | B1 | 9/2005 | Aiken, Jr. et al. |
| 6,965,928 | B1 | 11/2005 | Cox et al. |
| 7,010,807 | B1 * | 3/2006 | Yanovsky .................... 726/24 |
| 7,013,482 | B1 | 3/2006 | Krumel |
| 7,225,467 | B2 | 5/2007 | Dapp |
| 7,461,403 | B1 | 12/2008 | Libenzi et al. |
| 7,603,716 | B2 | 10/2009 | Frank et al. |
| 2002/0018813 | A1 | 2/2002 | Antes et al. |
| 2002/0032765 | A1 | 2/2002 | Pezzutti |
| 2002/0095593 | A1 | 7/2002 | Daniell et al. |
| 2002/0143989 | A1 | 10/2002 | Huitema et al. |
| 2002/0156875 | A1 | 10/2002 | Pabla |
| 2003/0018701 | A1 | 1/2003 | Kaestle |
| 2003/0033536 | A1 * | 2/2003 | Pak et al. .................... 713/188 |
| 2003/0055962 | A1 * | 3/2003 | Freund et al. ............... 709/225 |
| 2003/0126468 | A1 | 7/2003 | Markham |
| 2003/0131259 | A1 | 7/2003 | Barton et al. |
| 2003/0145228 | A1 * | 7/2003 | Suuronen et al. ............ 713/201 |
| 2003/0191963 | A1 | 10/2003 | Balissat et al. |
| 2003/0196060 | A1 | 10/2003 | Miller |
| 2003/0236755 | A1 | 12/2003 | Dagelet |
| 2004/0034794 | A1 | 2/2004 | Mayer |
| 2004/0098482 | A1 | 5/2004 | Asano |
| 2004/0181689 | A1 | 9/2004 | Kiyoto |
| 2004/0243819 | A1 | 12/2004 | Bourne et al. |
| 2005/0027871 | A1 | 2/2005 | Bradley |
| 2005/0055280 | A1 | 3/2005 | Jeans |
| 2005/0076218 | A1 | 4/2005 | Brown |
| 2005/0160291 | A1 | 7/2005 | Eden et al. |
| 2005/0160477 | A1 | 7/2005 | Saito |
| 2005/0182928 | A1 | 8/2005 | Kamalanathan et al. |
| 2005/0182967 | A1 | 8/2005 | Phillips et al. |
| 2005/0183138 | A1 | 8/2005 | Phillips et al. |
| 2005/0193219 | A1 | 9/2005 | Vanstone |
| 2006/0095965 | A1 | 5/2006 | Phillips et al. |
| 2006/0212572 | A1 | 9/2006 | Afek et al. |
| 2008/0016568 | A1 | 1/2008 | Szor et al. |

FOREIGN PATENT DOCUMENTS

| | | |
|---|---|---|
| EP | 1 335 563 A2 | 8/2003 |
| EP | 1 361 728 A2 | 12/2003 |
| WO | WO 99/05814 A2 | 2/1999 |
| WO | WO 01/33320 A2 | 5/2001 |
| WO | WO 01/91418 A2 | 11/2001 |
| WO | WO 2004/034672 A1 | 4/2004 |
| WO | WO 2004/057834 A2 | 7/2004 |
| WO | WO 2005026872 A2 | 3/2005 |
| WO | WO 2005078993 A1 | 8/2005 |

OTHER PUBLICATIONS

Ajmani et al., "ConChord: Cooperative SDSI Certificate Storage and Name Resolution," First International Workshop on Peer-to-Peer Systems (IPTPS), 14 pages, Mar. 2002.

Balke et al., "Caching for Improved Retrieval in Peer-to-Peer Networks," L3S Research Center and University of Hannover, (date unknown), 6 pages; http://www.l3s.de/apis/paper/gi-;tg05.pdf.

Beaver, K. "Are P2P Applications worth the risk?" 2005 Tech Target, http://searchsecurity.techtarget.com/tip/1,289483.sid14_gci929175.html, 5 pages, retrieved Dec. 15, 2005.

Campbell, C., "Securing your peer-to-peer networks," Tech Target, Sep. 12, 2001, http://searchsecurity.techtarget.com./originalContent/0,289142, sid14_gci769396.00.html?MOT, 4 pages, retrieved Dec. 15, 2005.

Chen et al., "A Scalable Semantic Indexing Framework for Peer-to-Peer Information Retrieval," 8 pages: http://hdir2005.isti.cnr.it/camera-ready/7.Chen.pdf, (date unknown).

Chien E., "Malicious threats of Peer-to-Peer Networking," Symantec, copyright 2003, hht://enterprisesecurity.symantec.com/PDF/malicious_threats.pdf, 12 pages.

Dabek, F., et al. "Building Peer-to-Peer Systems with Chord, a Distributed Lookup Service, at MIT Laboratory for Computer Science," (date unknown), 6 pages, at http://pdocs.lcs.mit.edu/chord.

DeFigueiredo et al., "Analysis of peer-to-peer network security using Gnutella," (date unknown), 20 pages, http://www.cs.berkeley.edu/-daw/teaching/cs261-f02/reports/defig.pdf.

Druschel, P., et al., PAST: A large-scale, persistent peer-to-peer storage utility, at Rice University and Microsoft Research, (date unknown), 6 pages.

Ellison, C., et al., Simple Public Key Certificate, (Internet Draft 1999), at http://www.world.std.com/~cme/spki.txt (Aug. 6, 2001), 46 pages.

Ellison, C. et al., SPKI Certificate Theory, (The Internet Society 1999), at http://www.ietf.org/rfc/rfc2693.txt?number=2692, (Aug. 6, 2001), 41 pages.

Ellison, C. et al., SPKI Requirements, (The Internet Society 1999) at http://www.ietf.org/rfc/rfc2692.txt?number=2693 2001, 14 pages.

Erdelsky, P. The Birthday Paradox, EFG, at http://efgh.com/math/birthday.htm (Mar. 8, 2002), 3 pages, retrieved Jul. 22, 2009.

FAQ: Network Intrusion Detection System, Mar. 21, 2000, pp. 1-42, Linux, retrieved Mar. 2, 2009.

Housely et al., "Internet X.509 Public Key Infrastructure Certificate and CRL Profile." Network Working Group (Jan. 1999), pp. 1-121, retrieved from http://ietf/rfc/rfc2459.txt?number_2459 Sep. 18, 2003.

IT World: McAfee announces new slate of 2002 security products, Aug. 31, 2001, http://www.itworld.com/IDG010831mcafee, 10 pages.

Jianming Lv et al., "WonGoo: A Pure Peer-to-Peer Full Text Information Retrieval System Based on Semantic Overlay Networks;" Institute of Computing Technology Chinese Academy of Sciences Beijing, China; Proceedings of the Third IEEE International Symposium on Network Computing and Applications (NCA'04), dated Apr. 2004, 8 pages, http://portal.acm.org/citation.cfm?id=1025126.1025936.

Kim et al., "A Secure Platform for Peer-to-Peer Computing in the Internet," Proceedings of the 35th Hawaii International Conference on System Sciences, IEEE Computer Society, 2002, pp. 3948-3957.

Lai, K. et al., Measuring Link Bandwidths Using a Deterministic Model of Packet Delay, at Department of Computer Science at Stanford University, (date unknown), 13 pages.

Mazieres et al., "Separating Key Management from File System Security," Operating Systems Review ACM, vol. 33, No. 5, Dec. 1999, pp. 124-139.

McAfee Access Control 3.0 Product and Installation Guide, 2008, McAfee Inc., 83 pages.

Red-Black Tree, National Institute of Standards and Technology, at http://www.nist.gov/dads/HTML/redblack.html (Mar. 5, 2002), 2 pages, retrieved Jul. 22, 2009.

Rowstron et al., Pastry: Scalable, distributed object location and routing for large-scale peer-to-peer systems, at Microsoft Research Ltd., St. George House and Rice University, 20 pages, Nov. 2001.

Rowstron et al., SCRIBE: The design of a large-scale event notification infrastructure, at Microsoft Research, Ltd., St. George House and Rice University, 20 pages, Nov. 2001.

Rowstron et al., Storage Management and Caching in PAST, a large-scale, persistent peer-to-peer storage utility, at Microsoft Research, Ltd., St. George House and Rice University, 14 pages, copyright 2001.

Smith, Implementing Least Privilege with AD, Feb. 21, 2002, 3 pages, http://windowsitpro.com/WindowsSecurity/article/articleid/23967/implementing-least-privil..., retrieved Mar. 3, 2009.

Understanding Active Directory Replication, Feb. 17, 2000, p. 171-180, PHO10-Simmons14.

"The Microsoft Guide to Security Patch Management: Patterns and Practices", Jul. 3, 2003.

* cited by examiner

SYSTEM AND METHOD FOR SECURING A COMPUTER SYSTEM CONNECTED TO A NETWORK FROM ATTACKS

CROSS-REFERENCE TO RELATED APPLICATION

This application claims the benefit of U.S. Provisional Application No. 60/544,783, filed Feb. 13, 2004.

FIELD OF THE INVENTION

The present invention relates to a computer system and computer implemented method for securing computing devices connected to a network from attacks.

BACKGROUND OF THE INVENTION

As more and more computers, and other computing devices, are inter-connected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features, all of which exploit one or more computer system vulnerabilities for illegitimate purposes. While those skilled in the art will realize that the various computer attacks are technically distinct from one another, for purposes of the present invention and for simplicity in description, all of these attacks will be generally referred to hereafter as computer exploits, or more simply, exploits.

When a computer system is attacked or "infected" by a computer exploit, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer exploits is that an infected computer system is used to infect other computers.

FIG. 1 is a pictorial diagram illustrating an exemplary networked environment 100 over which a computer exploit is commonly distributed. As shown in FIG. 1, the typical exemplary networked environment 100 includes a plurality of computers 102-108 all inter-connected via a communication network 110, such as an intranet or via a larger communication network including the global TCP/IP network commonly referred to as the Internet. For whatever reason, a malicious party on a computer connected to the network 110, such as computer 102, develops a computer exploit 112 and releases it on the network. The released computer exploit 112 is received by, and infects, one or more computers, such as computer 104, as indicated by arrow 114. As is typical with many computer exploits, once infected, computer 104 is used to infect other computers, such as computer 106 as indicated by arrow 116, which in turn infects yet other computers, such as computer 108 as indicated by arrow 118. Clearly, due to the speed and reach of the modern computer networks, a computer exploit 112 can "grow" at an exponential rate, and quickly become a local epidemic that quickly escalates into a global computer pandemic.

A traditional defense against computer exploits, and particularly computer viruses and worms, is anti-virus software. Generally, anti-virus software scans incoming data, arriving over a network, looking for identifiable patterns associated with known computer exploits. Upon detecting a pattern associated with a known computer exploit, the anti-virus software may respond by removing the computer virus from the infected data, quarantining the data, or deleting the "infected" incoming data. Unfortunately, anti-virus software typically works with "known," identifiable computer exploits. Frequently, this is done by matching patterns within the data to what is referred to as a "signature" of the exploit. One of the core deficiencies in this exploit detection model is that an unknown computer exploit may propagate unchecked in a network until a computer's anti-virus software is updated to identify and respond to the new computer exploit.

As anti-virus software has become more sophisticated and efficient at recognizing thousands of known computer exploits, so too have the computer exploits become more sophisticated. For example, many recent computer exploits are now polymorphic, or in other words, have no identifiable pattern or "signature" by which they can be recognized by anti-virus software in transit. These polymorphic exploits are frequently unrecognizable by anti-virus software because they modify themselves before propagating to another computer system.

Another defense that is common today in protecting against computer exploits is a hardware or software network firewall. As those skilled in the art will recognize, a firewall is a security system that protects an internal network from unauthorized access originating from external networks by controlling the flow of information between the internal network and the external networks. All communications originating outside of the firewall are first sent to a proxy that examines the communication, and determines whether it is safe or permissible to forward the communication to the intended target. Unfortunately, properly configuring a firewall so that permissible network activities are uninhibited and that impermissible network activities are denied is a sophisticated and complicated task. In addition to being technically complex, a firewall configuration is difficult to manage. When firewalls are improperly configured, permissible network traffic may be inadvertently shut down and impermissible network traffic may be allowed through, compromising the internal network. For this reason, changes to firewalls are generally made infrequently, and only by those well versed in the subject of technical network design.

As yet a further limitation of firewalls, while a firewall protects an internal network, it does not provide any protection for specific computers. In other words, a firewall does not adapt itself to a specific computer's needs. Instead, even if a firewall is used to protect a single computer, it still protects that computer according to the firewall's configuration, not according to the single computer's configuration.

Yet another issue related to firewalls is that they do not provide protection from computer exploits originating within the borders established by a firewall. In other words, once an exploit is able to penetrate the network protected by a firewall, the exploit is uninhibited by the firewall. This situation frequently arises when an employee takes a portable computer home (i.e., outside of the corporate firewall protection) and uses it at home in a less secured environment. Unknown to the employee, the portable computer is then infected. When the portable computer is reconnected to the corporate network within the protection of the firewall, the exploit is often free to infect other computers unchecked by the firewall.

As mentioned above, computer exploits now also leverage legitimate computer system features in an attack. Thus, many parties other than firewall and anti-virus software providers must now join in defending computers from these computer exploits. For example, operating system providers must now, for economic and contractual reasons, continually analyze their operating system functions to identify weaknesses or vulnerabilities that may be used by a computer exploit. For purposes of the present discussion, any avenue by which a computer exploit may attack a computer system will be generally referred to as a computer system vulnerability, or simply a vulnerability.

As vulnerabilities are identified and addressed in an operating system, or other computer system components, drivers, applications, the provider will typically release a software update to remedy the vulnerability. These updates, frequently referred to as patches, should be installed on a computer system in order to secure the computer system from the identified vulnerabilities. However, these updates are, in essence, code changes to components of the operating system, device drivers, or software applications. As such, they cannot be released as rapidly and freely as anti-virus updates from anti-virus software providers. Because these updates are code changes, the software updates require substantial in-house testing prior to being released to the public. Unfortunately, even with in-house testing, a software update may cause one or more other computer system features to break or malfunction. Thus, software updates create a huge dilemma to parties that rely upon the computer systems. More specifically, does a party update their computer systems to protect them from the vulnerability and risk disrupting their computer systems' operations, or does the party refrain from updating their computer systems and run the risk that their computer systems may be infected?

Under the present system, there is a period of time, referred to hereafter as a vulnerability window, that exists between when a new computer exploit is released on the network 110 and when a computer system is updated to protect it from the computer exploit. As the name suggests, it is during this vulnerability window that a computer system is vulnerable, or exposed, to the new computer exploit. FIGS. 2A-2B are block diagrams of exemplary timelines illustrating this vulnerability window. In regard to the following discussions regarding timelines, significant times or events will be identified and referred to as events in regard to a timeline.

FIG. 2A illustrates a vulnerability window of computer systems with regard to one of the more recent, sophisticated class of computer exploits that are now being released on public networks. As will be described below, this new class of computer exploits take advantage of a system provider's proactive security measures to identify computer system vulnerabilities, and subsequently, create and deliver a computer exploit.

With reference to FIG. 2A, at event 202, an operating system provider identifies the presence of a vulnerability in the released operating system. For example, in one scenario, the operating system provider, performing its own internal analysis of a released operating system, uncovers a previously unknown vulnerability that could be used to attack a computer system. In an alternative scenario, the previously unknown vulnerability is discovered by third parties, including organizations that perform system security analyses on computer systems, and relays information regarding the vulnerability to the operating system provider.

Once the operating system provider is aware of the presence of the security vulnerability, the operating system provider addresses the vulnerability which, at event 204, leads to the creation and release of a patch to secure any computer systems running the operating system. Typically, an operating system provider will make some type of announcement that there is a system patch available, along with a recommendation to all operating system users to install the patch. The patch is usually placed in a known location on the network 110 for downloading and installation onto affected computer systems.

Unfortunately, as happens all too often, after the operating system provider releases the patch, at event 206, a malicious party downloads the patch and, using some reverse engineering as well as any information made public by the operating system or others, identifies the specifics regarding the "fixed" vulnerability in the operating system. Using this information, the malicious party creates a computer exploit to attack the underlying vulnerability. At event 208, the malicious party releases the computer exploit onto the network 110. While the goal of issuing a software patch, also known as a "fix," is to correct an underlying vulnerability, the "fix" is often a complex piece of software code which itself, unfortunately, may create or contain a new vulnerability that could be attacked by a computer exploit created by a malicious party. Thus, in addition to evaluating what the "fix" corrects, the "fix" is also evaluated for potential vulnerabilities.

While a "fix" is available, the malicious party realizes that, for various reasons including those described above, not every vulnerable computer system will be immediately upgraded. Thus, at event 208, the malicious party releases the computer exploit 112 onto the network 110. The release of the computer exploit 112 opens a vulnerability window 212, as described above, in which the vulnerable computer systems are susceptible to this computer exploit. Only when the patch is finally installed on a computer system, at event 210, is the vulnerability window 212 closed for that computer system.

While many computer exploits released today are based on known vulnerabilities, such as in the scenario described in regard to FIG. 2A, occasionally, a computer exploit is released on the network 110 that takes advantage of a previously unknown vulnerability. FIG. 2B illustrates a vulnerability window 230 with regard to a timeline 220 under this scenario. Thus, as shown on timeline 220, at event 222, a malicious party releases a new computer exploit. As this is a new computer exploit, there is neither an operating system patch nor an anti-virus update available to protect vulnerable computer systems from the attack. Correspondingly, the vulnerability window 230 is opened.

At some point after the new computer exploit is circulating on the network 110, the operating system provider and/or the anti-virus software provider detects the new computer exploit, as indicated by event 224. As those skilled in the art will appreciate, typically, the presence of the new computer exploit is detected within a matter of hours by both the operating system provider and the anti-virus software provider.

Once the computer exploit is detected, the anti-virus software provider can begin its process to identify a pattern, or "signature," by which the anti-virus software may recognize the computer exploit. Similarly, the operating system provider begins its process to analyze the computer exploit to determine whether the operating system must be patched to protect it from the computer exploit. As a result of these parallel efforts, at event 226, the operating system provider and/or the anti-virus software provider releases an update, i.e., a software patch to the operating system or an anti-virus update, which addresses the computer exploit. Subsequently, at event 228, the update is installed on a user's computer system, thereby protecting the computer system and bringing the vulnerability window 230 to a close.

As can be seen from the examples above, which are only representative of all of the possible scenarios in which computer exploits pose security threats to a computer system, a vulnerability window exists between the times that a computer exploit 112 is released on a network 110, and when a corresponding update is installed on a user's computer system to close the vulnerability window. Sadly, whether the vulnerability window is large or small, an infected computer costs the computer's owner substantial amounts of money to "disinfect" and repair, if it is at all possible. This cost can be enormous when dealing with large corporations or entities that may have thousands or hundreds of thousands of devices attached to a network 110. Such a cost is further amplified by the possibility that such an exploit tamper or destroys customer data, all of which may be extremely difficult or impossible to trace and remedy. What is needed is a system and method for securing a computer system against computer exploits in a responsive manner and according to the individual computer system's needs, even before a protective update is available and/or installed on the computer system. These, and other issues found in the prior art, are addressed by the present invention.

SUMMARY OF THE INVENTION

In accordance with aspects of the present invention, a network security system for protecting computing devices connected to a communication network from security threats is presented. The network security system includes a network security module. The network security module is interposed between computing device and the communication network. The network security system also includes a security service. The security service publishes security information to network security modules which, when implemented by the network security module, protects the computing device from the security threat.

In accordance with further aspects of the present invention, a method for securing computing devices in a communication network from security threats delivered over the communication network is provided. Information relating to a security threat to computing devices in the communication network is obtained. Security information relating to the security threat is published to network security modules. Each network security module is interposed between a computing device and the communication network. The security information includes protective security measures which, when enforced by a network security module, secures the computing device from at-risk network activities between the computing device and the communication network.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 3A:
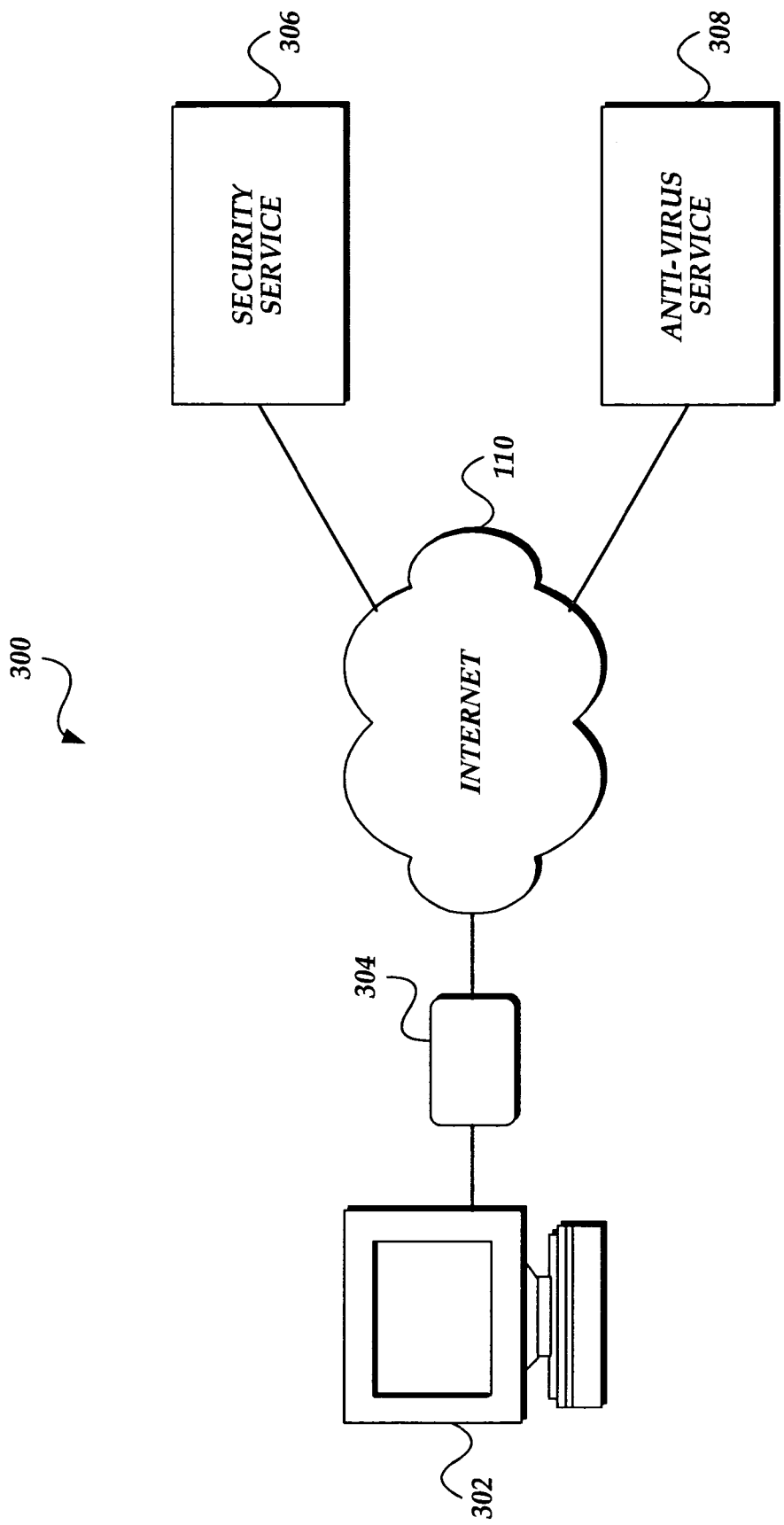
FIGS. 3A and 3B are pictorial diagrams illustrating exemplary networked environments suitable for implementing aspects of the present invention.

FIG. 3A is a pictorial diagram illustrating an exemplary networked environment 300 suitable for implementing aspects of the present invention. The exemplary networked environment 300 includes a computer 302 connected to a network 110. It should be noted that while the present invention is generally described in terms of operating in conjunction with a personal computer, such as computer 302, it is for illustration purposes only, and should not be construed as limiting upon the present invention. Those skilled in the art will readily recognize that almost any networked computing device may be attacked by a computer exploit. Accordingly, the present invention may be advantageously implemented to protect numerous types of computers, computing devices, or computing systems including, but not limited to, personal computers, tablet computers, notebook computers, personal digital assistants (PDAs), mini- and mainframe computers, wireless phones (frequently referred to as cell phones), hybrid computing devices such as wireless phone/PDA combinations, and the like. The present invention may also be advantageously implemented to protect hardware devices, peripheral devices, software applications, device drivers, operating systems, and the like.

It should be appreciated that the network 110 may include any number of actual communication networks. These actual communication networks include, but are not limited to, the Internet, wide and local area networks, intranets, cellular networks, IEEE 802.11 and Bluetooth wireless networks, and the like. Accordingly, while the present invention is discussed in terms of a computer network, and in particular the Internet, it is for illustration purposes only, and should not be construed as limiting upon the present invention.

The exemplary networked environment 300 also includes a network security module 304 and a security service 306. The network security module 304 is interposed between a computer, such as computer 302, and the network 110. The network security module 304 may be interposed between the computer 302 and the network 110 either physically or logically. Communications between the computer 302 and the network 110 flow through the network security module 304. According to the present invention, the network security module 304 selectively controls the network activities between the computer 302 and the network 110 according to security information corresponding to the computer's specific configuration, including, but not limited to, the particular operating system revision installed on the computer 302, anti-virus information, including revision information for both the anti-virus software and corresponding signature data files, installed applications, device drivers, and the like, all of which may be a potential target of a computer exploit to take advantage of a computer system vulnerability.

According to one embodiment of the present invention, in order to periodically obtain security information from the security service 306, the network security module 304 periodically issues a security information request to the security service 306 for security information corresponding to the particular, specific configuration of the computer 302. The network security module 304 may be configured to periodically obtain the security information from the security service 306. For example, the network security module 304 may be configured to obtain security information from the security service 306 every minute. Alternatively, the network security module 304 may be configured to obtain security information from the security service 306 according to a user specified period of time.

Obtaining security information corresponding to a computer's particular, specific configuration is important as many users must delay updating their computer systems for a myriad of reasons. For example, a delay in updating an operating system or anti-virus software may occur because a computer has been inactive for a while. Thus, while the most recent revision of operating system and/or anti-virus software may provide adequate protection from a newly discovered computer exploit, a computer may not be "up to date", and thus, susceptible to the computer exploit and must implement security measures that corresponds with the computer's particular configuration. Accordingly, the security information request may include, but is not limited to, information identifying the computer's operating system revision, including installed patches; the particular anti-virus software and revision used by the computer, as well as software and data file updates; and network-enabled application information, such as e-mail or browser identifiers, revisions, firmware providers and versions, and other security settings.

According to aspects of the present invention, the network security module 304 obtains the computer's particular configuration information as one of the acts of updating a computer system component. For example, when a user installs an operating system patch on the computer 302, as one of the acts of installing the operating system patch, the network security module 304 is notified of the now current revision of the operating system. Similarly, other computer system features, such as a network-enabled application or anti-virus software, notify the network security module 304 as they are updated, all so that the network security module may obtain the most accurate and sufficient security information to protect the computer 302 according to the computer's specific current configuration.

Based on the computer's particular configuration information in the security information request, the security service 306 identifies relevant security information to protect the computer from known or perceived computer system vulnerabilities. Identifying relevant security information is described in greater detail below. The security information includes protective security measures, to be implemented by the network security module 304, that enable the network security module to insulate the computer 302 from computer exploits of known vulnerabilities. Protective security measures may include any number of network activity controls, or combinations thereof, including, but not limited to: blocking all network activities between the computer 302 and the network 110, except communications between certain known, secure network locations, such as the security service 306 or the anti-virus software service 308 for installing patches or updates; blocking network traffic on specific communication ports and addresses; blocking communications to and/or from certain network-related applications, such as an e-mail or Web browser application; and blocking access to particular hardware or software components on the computer 302. Thus, upon receiving the security response, the network security module implements the security measures.

As mentioned above, the network security module 304 is interposed between the computer 302 and the network 110 and, as such, all network activities between the computer and the network must flow through the network security module. As network traffic flows through the network security module 304, the network security module monitors the network traffic and implements the protective security measures received from the security service 306, such as blocking all network access except communications between known, secure locations, and the like.

According to further aspects of the present invention, a security response may also include a designated security level, such as levels red, yellow, and green. The security levels represent information that identifies, to the computer's 302 user, a representative level of protective measures implemented by the network security module 304. For example, a security level of red may indicate that the network security module 304 is currently blocking all network activities between the computer 302 and the network 110 except access to and from known, secure locations. Alternatively, a security level of yellow may indicate that the network security module 304 is currently implementing some protective security measures, yet the computer 302 may still otherwise communicate with the network 110. Still further, a security level of green may indicate that the network security module 304 is not implementing any protective security measures, and communications between the computer 302 and the network 110 are unrestricted. In accordance with the above described security levels, and for description purposes, a security level of red may also be referred to as full lock-down, a security level of yellow may also be referred to as partial lock-down, and a security level of green may also be referred to as free network access. While the above description identifies three security levels and a schema of red, yellow, and green, they are illustrative, and should not be construed as limiting upon the present invention. Those skilled in the art will readily recognize that any number of security levels may be implemented with alternative schemas for their representation to a user.

As the network security module 304 operates in an autonomic manner, i.e., requiring no user intervention, the above-identified security levels, as well as any corresponding visual representations of the security levels, are for user information purposes only. They may be used to provide the user with an indication of the level of restrictions that are implemented by the network security module 304. This visual indication may be especially useful when a user is trying to determine whether a network connection is malfunctioning, or that network activity is restricted due to current network security concerns.

According to aspects of the present invention and as an added measure of security, when the network security module 304 is powered up, the network security module enters a default state. This default state corresponds to the highest level of security, i.e., full lock-down, such that network activities between the computer 302 and trusted network locations are permissible. Either as part of the power up, or as part of the periodic communication with the security service 306, the network security module 304 obtains up-to-date security information and, depending on that security information, may impose less restrictive security measures. Clearly, implementing a default state of full lock-down at the network security module 304 is beneficial to the computer 302 as a vulnerability could have been identified, or an exploit released on the network 110 during the time that the network security module was powered off.

In accordance with one embodiment of the present invention, the network security module 304 does not request or access information from the computer 302. Instead, the network security module 304 operates on information transmitted to it from the computer 302 in connection with certain events. Thus, when a network security module 304 first commences to protect a computer, such as when a network security module is first interposed between a computer 302 and the network 110, the network security module will not have any specific configuration information corresponding to the computer system. As mentioned above, when the network security module 304 has no configuration information regarding the computer 302, or when the network security module 304 is powered up, the network security module enters its default state, i.e., full lock-down. However, as mentioned above, full lock-down will still permit the computer 302 to communicate with known, secure locations. As an example, these known, secure locations include the location, or locations, where operating system updates are located. Thus, a user may run an update process that results in configuration information being sent to the network security module 304, even when the computer 302 is configured with the latest operating system, anti-virus software, application, and device driver revisions and updates that are available. Alternatively, a specific program may be provided that notifies the network security module 304 of the computer system's current configuration.

In order to ensure that communications between the network security module 304 and the security service 306 are authentic and uncorrupted, in one embodiment of the present invention, communications between the network security module and the security service, such as security requests and security information, are delivered in encrypted, secured communications, such as secured communications using the Secure Sockets Layer (SSL) protocol. Similarly, communications between the network security module 304 and the computer 302 are also similarly secured.

According to optional aspects of the present invention, the network security module 304 continues to operate, i.e., obtain security information corresponding to the computer 302, even when the computer is powered off. For example, the network security module 304 may continue to obtain security information for the computer 302, all according to the latest operating system and/or anti-virus software revision data provided the computer when in was powered on. According to one embodiment, the network security module 304 is connected to the auxiliary power rail of a computer that, as is known to those skilled in the art, provides power to peripheral devices even when the computer 302 is powered off. Additionally, if the network security module 304 operates only when the computer 302 is operating, when the network security module resumes operation, the network security module implements a full lock-down while it obtains the most recent security information corresponding to the computer's current configuration.

According to another embodiment of the present invention, the network security module 304 may be optionally disabled by a user. This is useful as there are certain times that the necessity of full access to a network outweighs the risk of an attack from a computer exploit. For example, it may be necessary to disable the network security module 304 when attempting to diagnose networking problems/issues. Alternatively, some emergency situations, such as using the E911 voice over IP (VoIP) service may necessitate that the network security module 304 be disabled.

According to one aspect of the invention, when disabled, the network security module 304 continues to obtain security information from the security service 306, though it does not implement the protective security measures. Continually updating the security information is beneficial to the user, especially if the network security module 304 is only temporarily disabled, as the network security module will have the most recent security information when re-enabled. Alternatively, if the network security module 304 is disabled and not continually updating, after a predetermined period of no communication with the security service 306, the network security module may revert to its default condition, i.e., a full lock-down of network activity.

The security service 306 may be implemented as a single server/source for all security information, or alternatively, as a hierarchy of servers/sources distributed throughout the network 110. In a hierarchical system, a network security module 304 is initially configured with a root server/service in security service, one that will always be present. However, as part of the security information returned by the security service, perhaps in the first communication between the network security module 304 and the security service, the security service provides information regarding the hierarchy of the security service. This information may be provided as one or more ranges of network addresses, all of which are nodes in the security service hierarchy and that are able to provide the network security module 304 the appropriate security information. Thereafter, the network security module 304 need not necessarily query the original node to obtain information. Obviously, one advantage of implementing the security service in a hierarchical manner is that the security service may be easily scaled up or down in order to accommodate the number of network security module requesting information, and the original node in the security service hierarchy will not be overwhelmed by security information requests from all network security modules in a network. Under a hierarchical structure distributed in the network 110, load balancing may also occur and redundancy may be built into the system such that if one node in the hierarchy fails, others may step in and provide the security information.

According to aspects of the present invention, the network security module 304 is transparent to the computer 302 and to the network 110, using a technique known in the art as port mimicking. Generally speaking, using port mimicking, the network security module 304 appears as the network 110 to the computer 302, and appears as the computer to devices on the network. Thus, network activity freely flows between the computer 302 and the network 110 through the network security module 304, unless the network security module determines that the communication is directed to the network security module, such as notification of an operating system update or a security information response, or unless the network security module must block the network activity according to the protective security measures.

As described above, the network security module 304 obtains security information from the security service 306 as a result of a query. Those skilled in the art will recognize this as a poll system, i.e., polling the security service 306 for the security information. However, in an alternative embodiment, the security service 306 advantageously broadcasts important security information to the network security modules in the network 110. For example, depending on the periodic intervals at which the network security modules in the networked environment 300 obtain security information from the security service 306, if a particularly virulent computer exploit begins to circulate the network 110, rather than wait for network security modules to request important security information, the security service broadcasts security information to the network security modules. This security information, referred to hereafter as a security bulletin, will typically include all configurations that are susceptible to the computer exploit, protective security measures to be taken, as well as indicating the corresponding security level. According to one embodiment of the present invention, the security bulletins are XML documents, organized according to a predetermined schema.

A system that broadcasts information to listeners is referred to as a push system, i.e., the security service 306 pushes important security information to the network security modules. According to aspects of the present invention, security bulletins are broadcast over the network 110 using a "guaranteed delivery" service. In a guaranteed delivery service, security bulletins are identified as high priority items, and in agreement with the network service providers, are delivered before the delivery of other network traffic that would otherwise be delivered first.

Figure 3B:
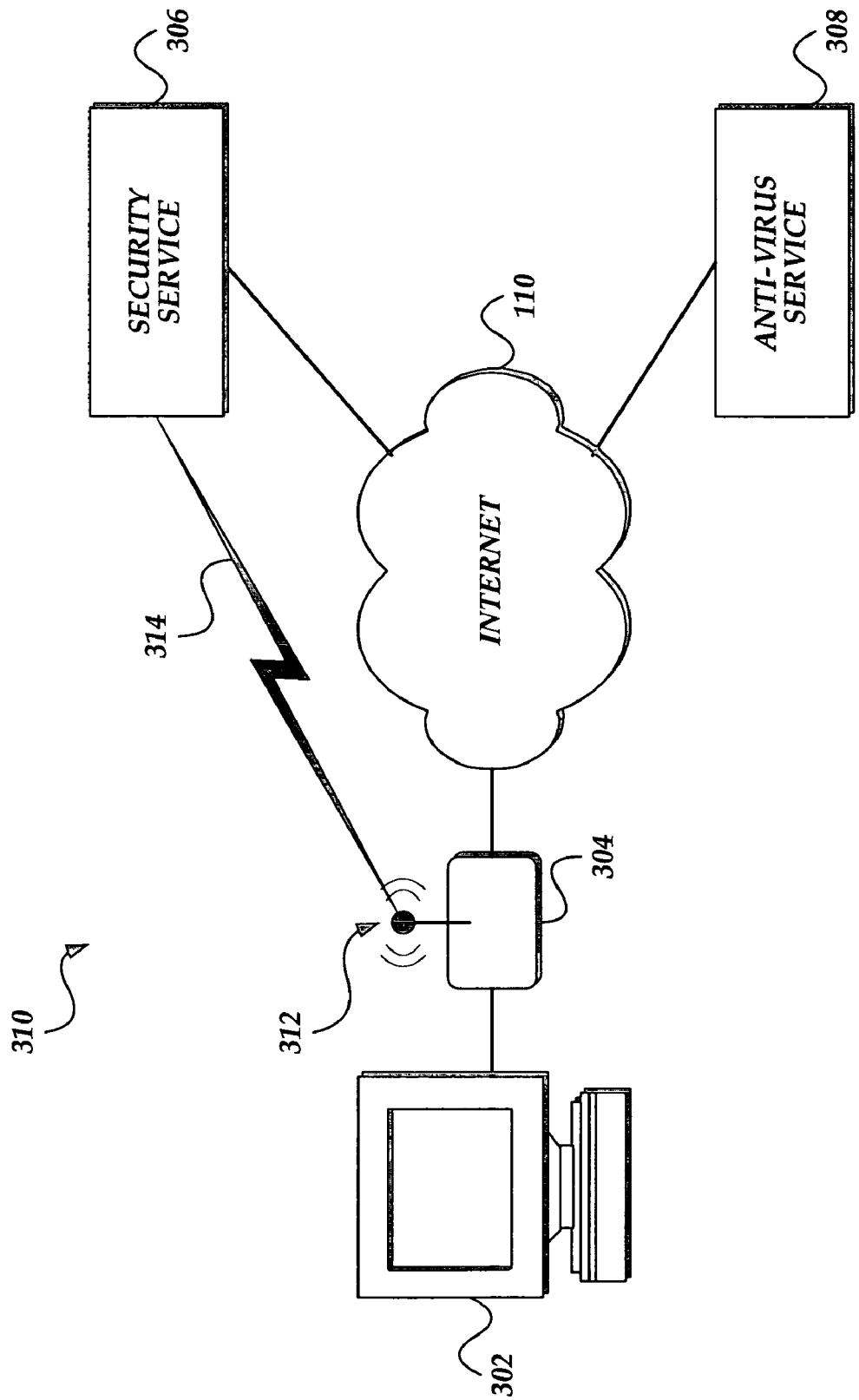

In addition to delivering the security bulletins over the same network 110 upon which the computer 302 communicates, there are many times that it would be advantageous to communicate "out of band," i.e., over a second communication link separate from the network 110. FIG. 3B is a pictorial diagram illustrating an alternatively configured networked environment 310 for implementing aspects of the present invention, including a second communication link 314 for delivering security information to the network security modules attached to the network 110.

As shown in FIG. 3B, the alternatively configured networked environment 310 includes similar components as those described above in regard to the networked environment 300, including the computer 302, the security service 306, and the network security module 304. However, the security service 306 is additionally configured to transmit security information, including both security information and/or security bulletins, to a network security module 304 specifically adapted with a receiving device 312 to receive the information over the second communication link 314. According to aspects of the present invention, the second communication link 314 may be a satellite communication link, a radio frequency broadcast, or some other form of secondary communication between the security service 306 and the network security module 304. Those skilled in the art will appreciate that any number of communication channels may be used.

According to alternative aspects of the invention, the second communication link 314 may be a one-way communication link from the security service 306 and the network security module 304, or a two-way communication link for communications between the security service and the security module. Additionally, software updates or patches, as mentioned above, may also be available for download over the second communication link 314 from the security service 306.

While the network security module 304 is interposed between the computer 302 and the Internet 110, actual embodiments of a network security module may vary. In each case, the network security module 304 is treated as a trusted component by the computer 302. According to one embodiment, the network security module 304 is implemented as a hardware device, sometimes called a "dongle," external to the computer 302, with connections to the network 110 and to the computer. Alternatively, the network security module 304 may be implemented as a hardware component integrated within the computer 302, or as an integrated sub-component within the computer's network interface. Integrating the network security module 304 within the computer 302 or as a sub-component on the computer's network interface may be especially useful when the computer 302 is connected to the network 110 via a wireless connection.

According to another alternative embodiment, the network security module may be implemented as logic, such as microcoding or firmware, within a component of the computer 302, including, but not limited to, the processor, graphics processing unit, north bridge, or south bridge. Accordingly, the network security module 304 should not be construed as limited to any particular embodiment.

It should be pointed out that one of the benefits realized by the present invention is that the system mitigates the effects of many exploits. For example, those skilled in the art will recognize that a denial of service (DOS) attack is an attempt to overwhelm a computer with network requests, to the end that the computer exhausts its resources and crashes, or alternatively, erroneously enters an ambiguous state that is more vulnerable to external attacks/exploits. However, with a network security module 304 responding to a security service 306 by implementing protective security measures, such exploits, including the potentially overwhelming network requests, never reach the computer 302.

Figure 4A:
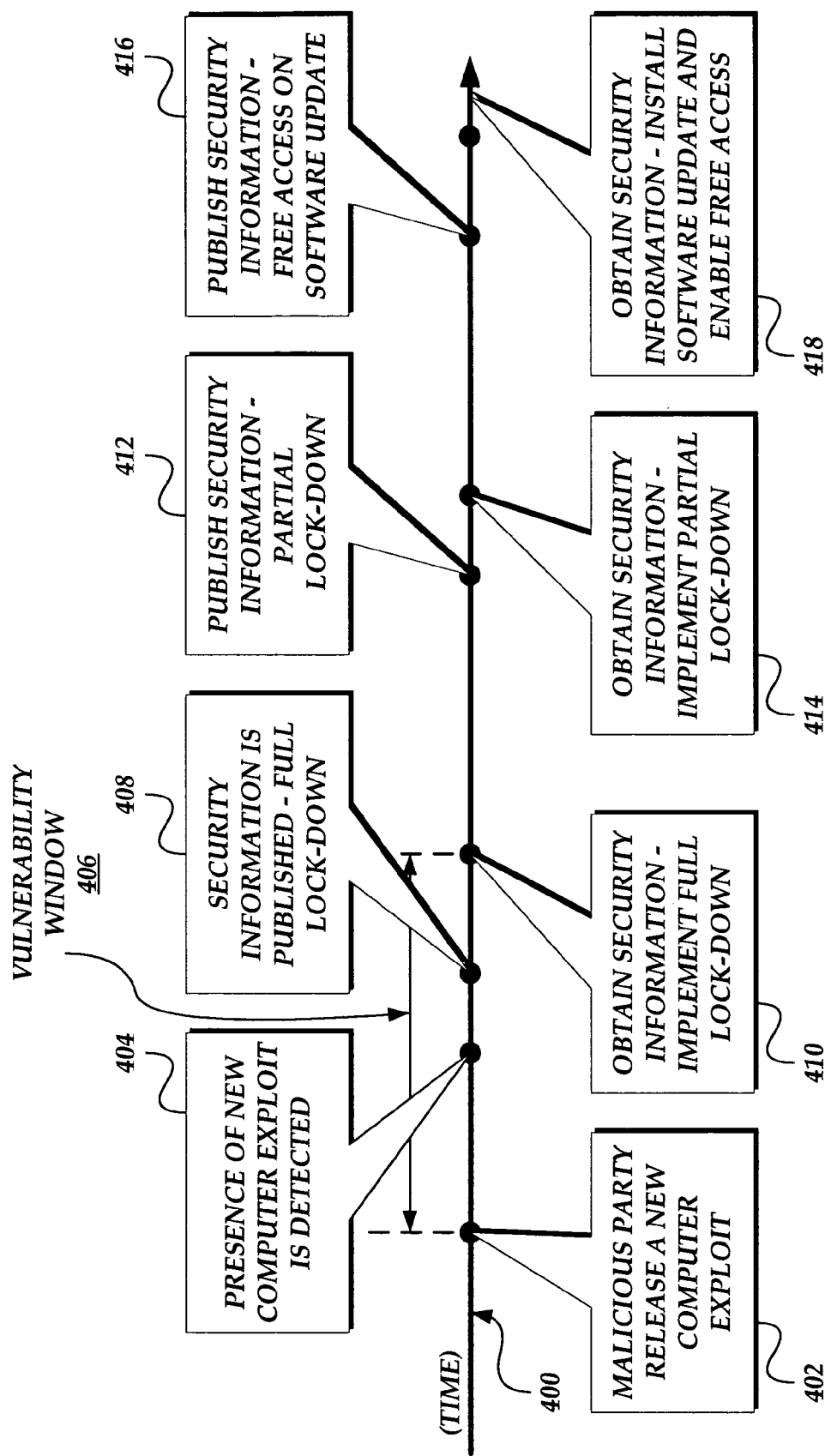
FIGS. 4A and 4B are pictorial diagrams of exemplary timelines for demonstrating how the present invention minimizes the vulnerability window associated with computer exploits.
Figure 4B:
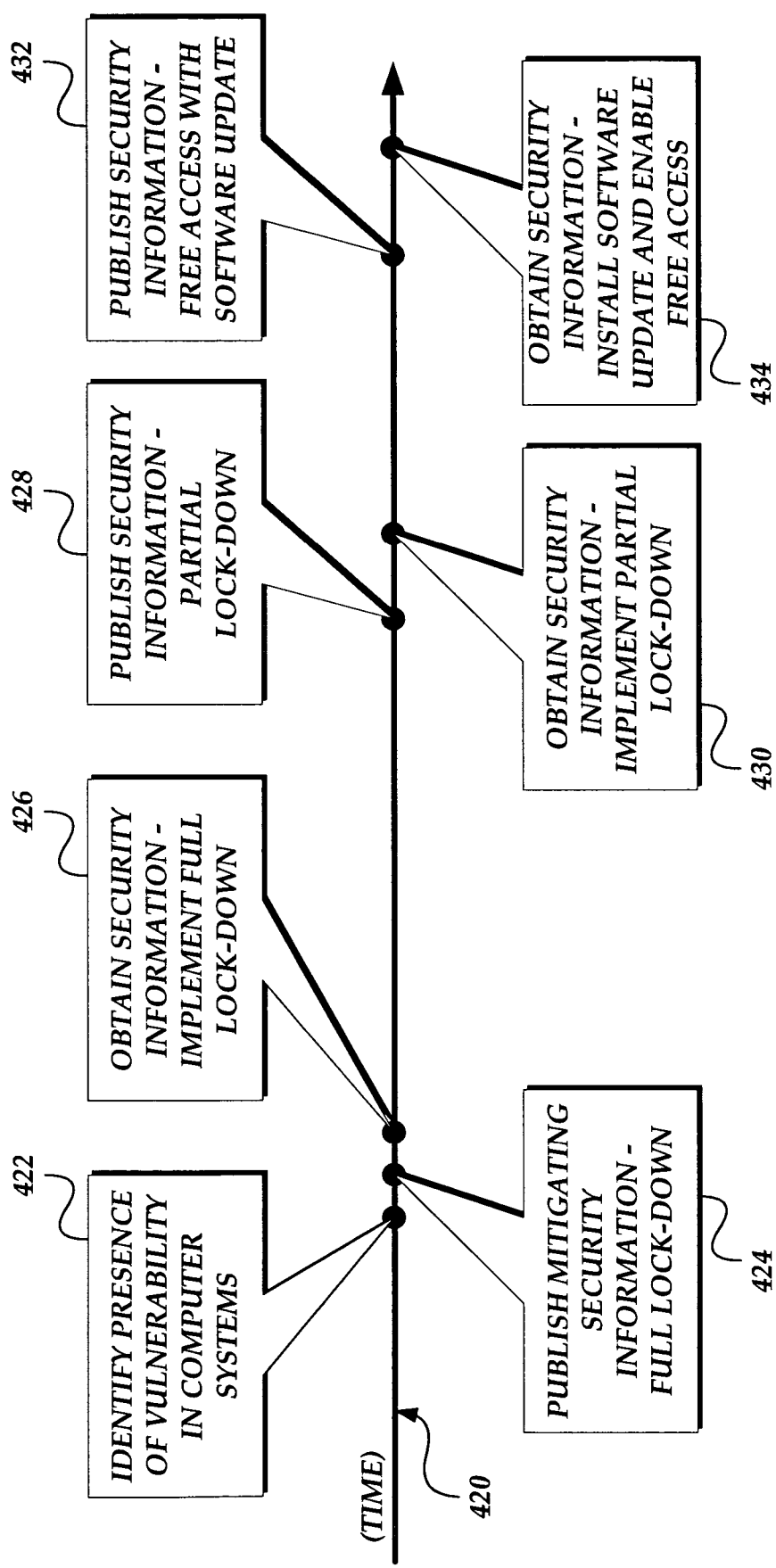

In order to more fully understand how the above-described components operate to provide enhanced security to the computer 302, reference is made to exemplary scenarios, illustrated on timelines with corresponding events. FIGS. 4A and 4B are block diagrams illustrating exemplary timelines for demonstrating the operation of the components of the present invention. More particularly, FIG. 4A is a block diagram illustrating an exemplary timeline 400 for demonstrating how the present invention minimizes the vulnerability window 406 of a computer 302 with regard to the release of a new computer exploit on the network 110. It should be noted that while the following is presented as a computer exploit attacking an operating system, it is for illustration purposes, and should not be construed as limiting upon the present invention. The present invention may be utilized to protect code modules, services, even hardware devices on a computer system.

As shown on the timeline 400, at event 402, a malicious party releases a new computer exploit onto the network 110. The release of the new computer exploit commences the vulnerability window 406 for computers connected to the network 110 targeted by the new computer exploit, such as computer 302. At event 404, the presence of the new computer exploit is detected, either by the operating system provider, the anti-virus provider, or others, as described above.

Upon detecting the presence of the new computer exploit, even before the nature or mode of attack of the exploit is identified, at event 408, the operating system provider, publishes security information via the security service 306. Typically, when a computer exploit is discovered, and its nature, extent, or mode of attack is not well known, the security service will set the security level for all apparently affected computer systems at red, i.e., full lock-down. At block 410, the network security module 304 obtains the security information, either in its periodic request or as a security bulletin, and implements the corresponding security measures, in this case, full lock-down. Beneficially, upon implementing the security measures from the security service 306, the vulnerability window 406 of targeted computers is closed.

Figure 1:
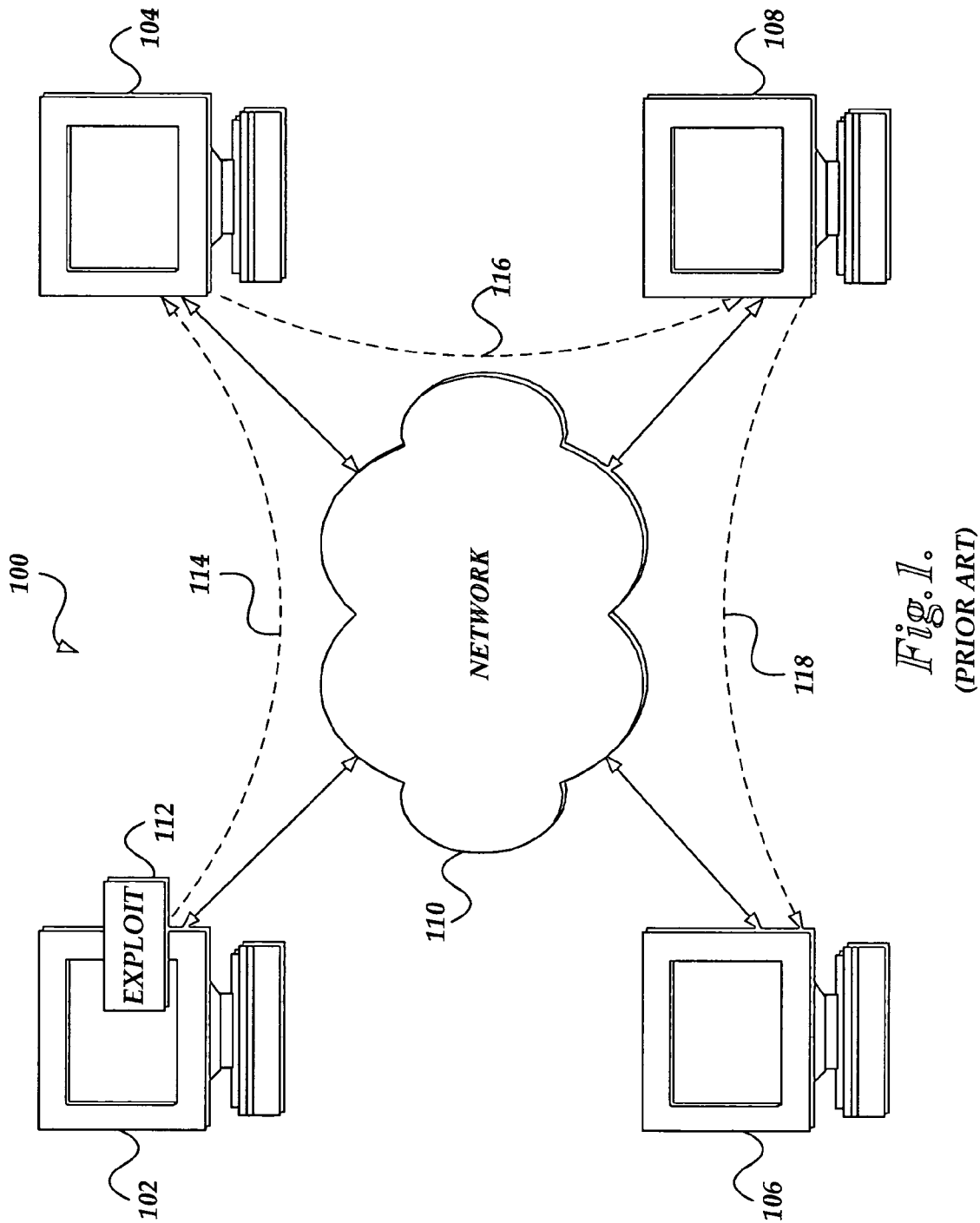
FIG. 1 is a pictorial diagram illustrating an exemplary network environment, as found in the prior art, over which a computer exploit is commonly distributed.
Figure 2A:
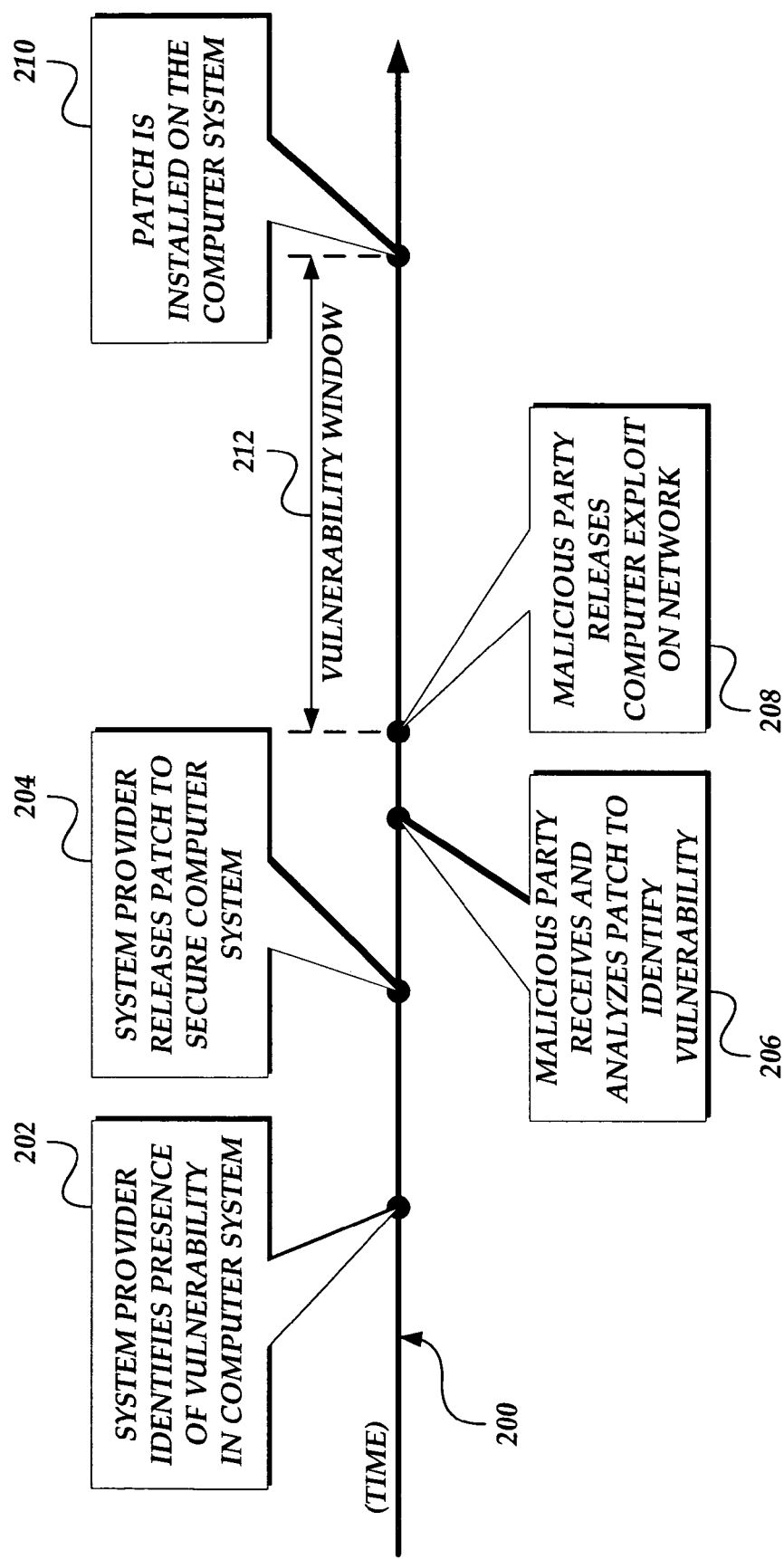
FIGS. 2A and 2B are block diagrams illustrating exemplary timelines demonstrating different vulnerability windows of computer systems with regard to computer exploits released on a network.
Figure 2B:
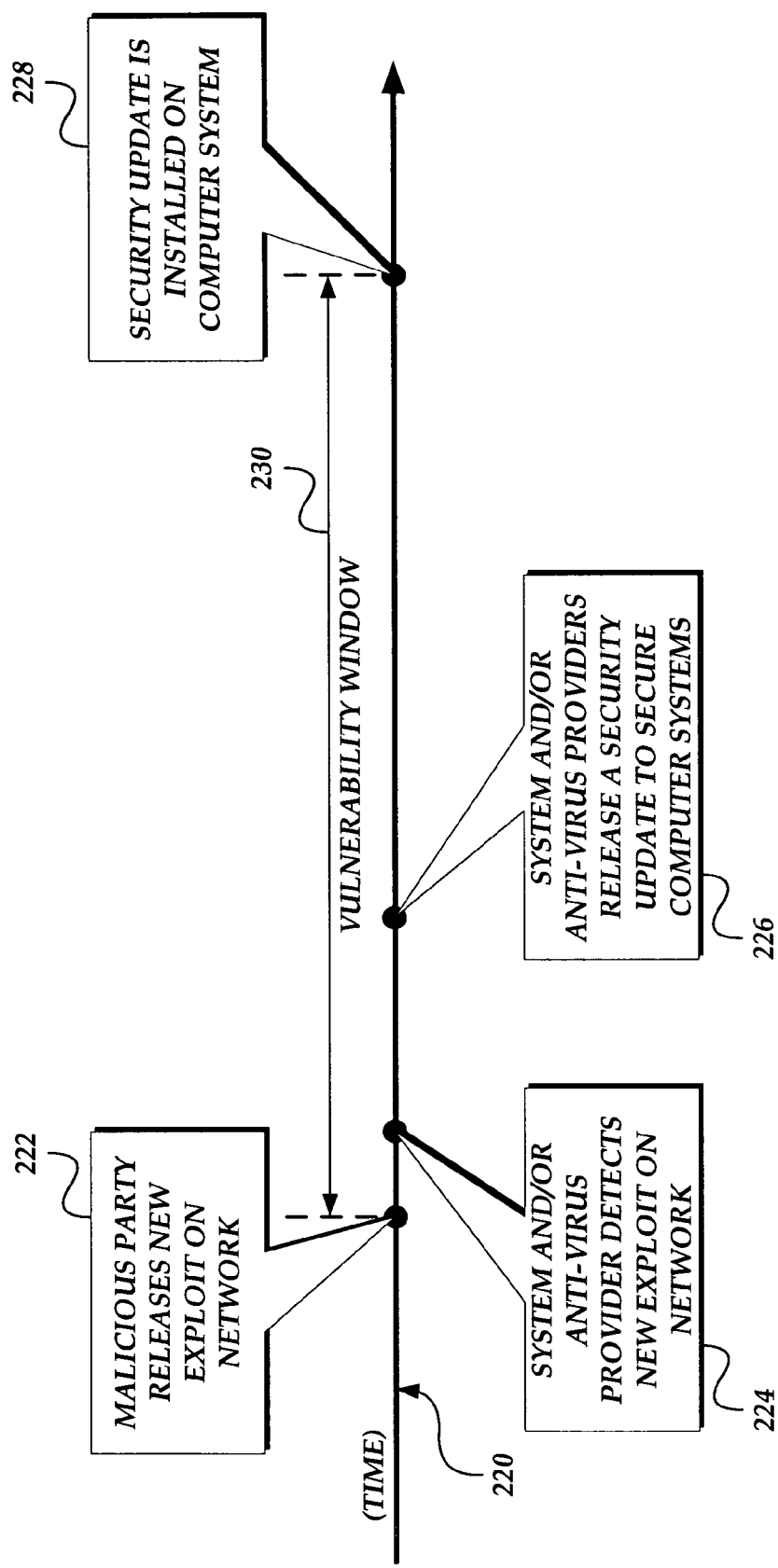

In contrast to the vulnerability window 230 of FIG. 2B, vulnerability window 406 is relatively small, thereby minimizing the exposure of targeted computer systems to the new computer exploit. Clearly, the actual length of time that a vulnerability window is open, such as vulnerability window 406, depends upon a small number of factors. One factor is the amount of time that passes before the computer exploit is detected. As discussed above, a new computer exploit is typically detected within fifteen minutes to a few hours from release. A second factor, much more variable than the first, is the amount of time it takes for the network security module 304 to obtain security information from the security service 306. Assuming that the network security module 304 may continually obtain security information, it may take mere seconds to obtain the security information and implement the corresponding security measures. However, if the network security module 304 cannot continually communicate with the security service 306, or if the periodic time frame for obtaining the security information is long, implementing the protective security measures may take a very long time. According to aspects of the present invention, if the network security module 304 is out of contact with the security service 306 for a predetermined amount of time, the network security module defaults to a full lock-down status, pending future communication from the security service.

After the initial security information is published, the operating system provider or anti-virus software provider will typically continue analyzing the computer exploit in order to better understand how it operates, and/or what specific computer system features it attacks. From this analysis, a second, perhaps less restrictive, set of protective measures is identified that vulnerable computer systems must take to prevent the computer exploit from infecting them. Accordingly, at event 412, updated security information is published with a security level of yellow and identifying protective measures to block at-risk network activities, i.e., partial lock-down. For example, as described above, the protective security measures may include simply blocking access to and from a specific range of communication ports, including the source and/or destination ports, or disabling e-mail communications, Web access, or other network activities directed to the operating system, applications, device drivers, and the like, installed on a protected computer system, while permitting other network activities to flow freely. It should be understood that "at-risk" network activities include network activities that represent a threat to a computing system by an exploit, whether or not the exploit attacks computer system flaws or simply abuses legitimate computer system features. Additionally, the "at-risk" network activities include network activities directed to a computer system that are unilaterally initiated by another device. In other words, "at-risk" network activities includes the network activities of exploits directed at a computer system that has done nothing more that connect to the network.

At event 414, the updated security information is obtained by the network security module 304, and the corresponding protective security measures are implemented. At event 416, after the operating system provider and/or anti-virus provider has generated and made available a software update, additional updated security information is published. This additional updated security information may identify that the security level is green, provided that a software update, such as an update from the operating system provider, the anti-virus software provider, or application provider, is installed on the computer 302. Subsequently, at event 418, the additional updated security information is obtained, the software updates are installed on the computer 302, and the network security module 304 enables free, i.e., unrestricted, network access.

FIG. 4B is a block diagram illustrating an alternative exemplary timeline 420 for demonstrating how the present invention eliminates the vulnerability window that may exist with regard to the release of a computer exploit on the network 110, more particularly, an exploit that takes advantage of a previously identified vulnerability rather than an entirely new attack. As mentioned, the use of a previously known vulnerability is much more commonplace than entirely new attacks. At event 422, the operating system provider identifies the presence of a vulnerability in the current release of the operating system. In response to the threat posed by the identified vulnerability, at event 424, the operating system provider publishes mitigating security information, setting the security level and identifying corresponding protective security measures. In the present example shown in FIG. 4B, assuming that the vulnerability poses a substantial risk to the computers connected to the network 110, the operating system provider publishes security information setting the security level to red with security measures to implement a full lock-down. At event 426, the network security module 304 obtains the latest security information and implements the full lock-down. It should be noted that security measures are implemented that protect the computer 302 from the identified vulnerability before a patch or "fix" is available. As the majority of computer exploits are somehow derived from information gained by analyzing the vulnerabilities that a patch corrects, a malicious party is proactively denied the opportunity to create an exploit to attack the vulnerability. Thus, no vulnerability window is opened. Obviously, this result is a substantial benefit to the computer user, especially in contrast to the corresponding time line 200 illustrated in FIG. 2A when the network security module is not implementing the security measures.

Frequently, after further analysis of the computer exploit, an operating system provider may determine a less restrictive set of protective measures that will protect the computers connected to the network from the computer exploit. Thus, as shown in FIG. 4B, at event 428, an updated security bulletin is published, setting the security level at yellow and including corresponding protective security measures, i.e., partial lock-down, that specifically address the exploited vulnerability, while enabling all other network activities. Correspondingly, at event 430, the updated security information is obtained and the network security module 304 implements the partial lock-down.

Once an operating system patch or anti-virus update is available which, if installed on a computer 302, would protect it from a computer exploit targeting the vulnerability, at event 432, the operating system provider publishes the information, and indicates that once installed, the network security modules may permit free network access, i.e., setting the security level to green once the patch is installed. Correspondingly, at event 434, after the patch or anti-virus update is installed on the computer 302, the network security module 304 enables free access.

Figure 5:
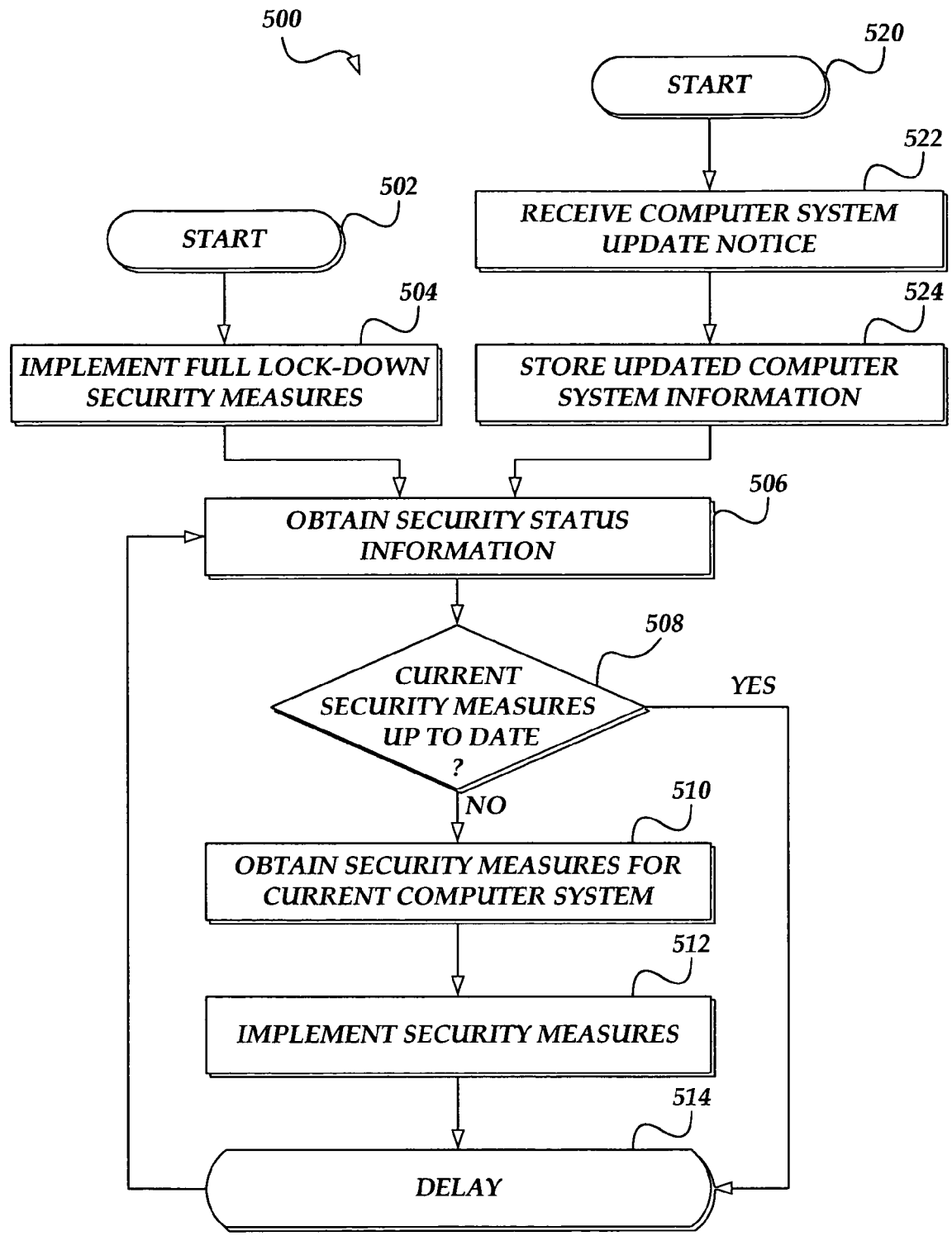
FIG. 5 is a flow diagram of an exemplary routine for dynamically controlling a computer system's network access according to published security information, in accordance with the present invention.

FIG. 5 is a flow diagram illustrating an exemplary routine 500 for dynamically controlling a computer's network access according to published security information. FIG. 5 includes two starting terminals, starting terminal 502 corresponding to the startup of a network security module 304, and starting terminal 520 corresponding to receiving an update notice from the computer system 302. Beginning first at starting terminal 502 and proceeding to block 504, the network security module 304 implements full lock-down related security measures. As described above, when in full lock-down, the computer is limited to accessing known, trusted network locations, including the security service 306, in order to obtain the latest security status information and any available updates.

At block 506, the network security module 304 obtains the latest security information from the security service 306 corresponding to the computer's current configuration. According to aspects of the present invention, the network security module 304 may obtain the latest security information from the security service by issuing a request to the security service for that information. Alternatively, the network security module 304 may obtain the latest security information as a broadcast from the security service 306, either over a second communication link or as a broadcast over the network.

At decision block 508, based on the latest security information obtained from the security service 306, the network security module 304 determines whether the currently implemented security measures, and corresponding security level, are up to date with the obtained security information. According to one aspect of the present invention, this determination is made as a simple comparison of revision information for the computer system that the network security module currently has stored against what the security service publishes as the latest revisions.

If the currently implemented security measures are not up to date, at block 510, the network security module 304 obtains security measures for the computer system according to information that the network security module has stored regarding the computer system. Alternatively (not shown), the security measures may be included with the obtained security information. Once the network security module 304 has the security measures, at block 512, the network security module implements the security measures and sets the corresponding security level, e.g., red, yellow, or green.

After implementing the security measures for the computer system, or alternatively, if the currently implemented security measures are up to date for the computer system, at block 514, the network security module 304 enters a delay state. This delay state corresponds to the time period for which the network security module 304 periodically queries the security service 306 to obtain the latest security information. After delaying for the predetermined amount of time, the process returns to block 506, where the process of obtaining the latest security information from the security service 306, determining if the currently implemented security measures are up to date for the computer system, and implementing any new security measures, is repeated.

As shown in FIG. 5, the exemplary routine 500 does not have an ending terminal as it is designed to operate continuously to protect the computer 302 from computer exploits. However, those skilled in the art will recognize that the routine 500 will terminate if the network security module 304 is powered off, disconnected from the exemplary networked environment 300, or explicitly disabled by a user, as described above.

With reference to the alternative starting terminal 520, this entry point represents the situation when the network security module 304 receives update notices from the computer system. As previously discussed, applications adapted to take advantage of the present invention will, as one of the steps to update the computer system, notify the network security module of now current revision information. For example, while updating the anti-virus software, one step of the process would be to issue a notice, intended for the network security module 304, advising the network security module of the now current revision. Thus, at block 522, the network security module receives an update notice.

At block 524, the update notice information is stored by the network security module for later use in determining whether the currently implemented security measures are up to date. Operating system updates, as well as other code module updates, may also be adapted to provide notice to the network security module 304 so that the security system may make more informed decisions as to the appropriate security measures necessary to protect any given computer system.

After storing the information, the routine 500 proceeds to block 506 where the steps of obtaining the latest security information from the security service 306, determining if the currently implemented security measures are up to date for the computer system, and implementing any new security measures is begun, as described above. As an alternative (not shown), after receiving updated computer system information at block 524, the network security module may wait to obtain security status information until a current delay state is finished.

Figure 6:
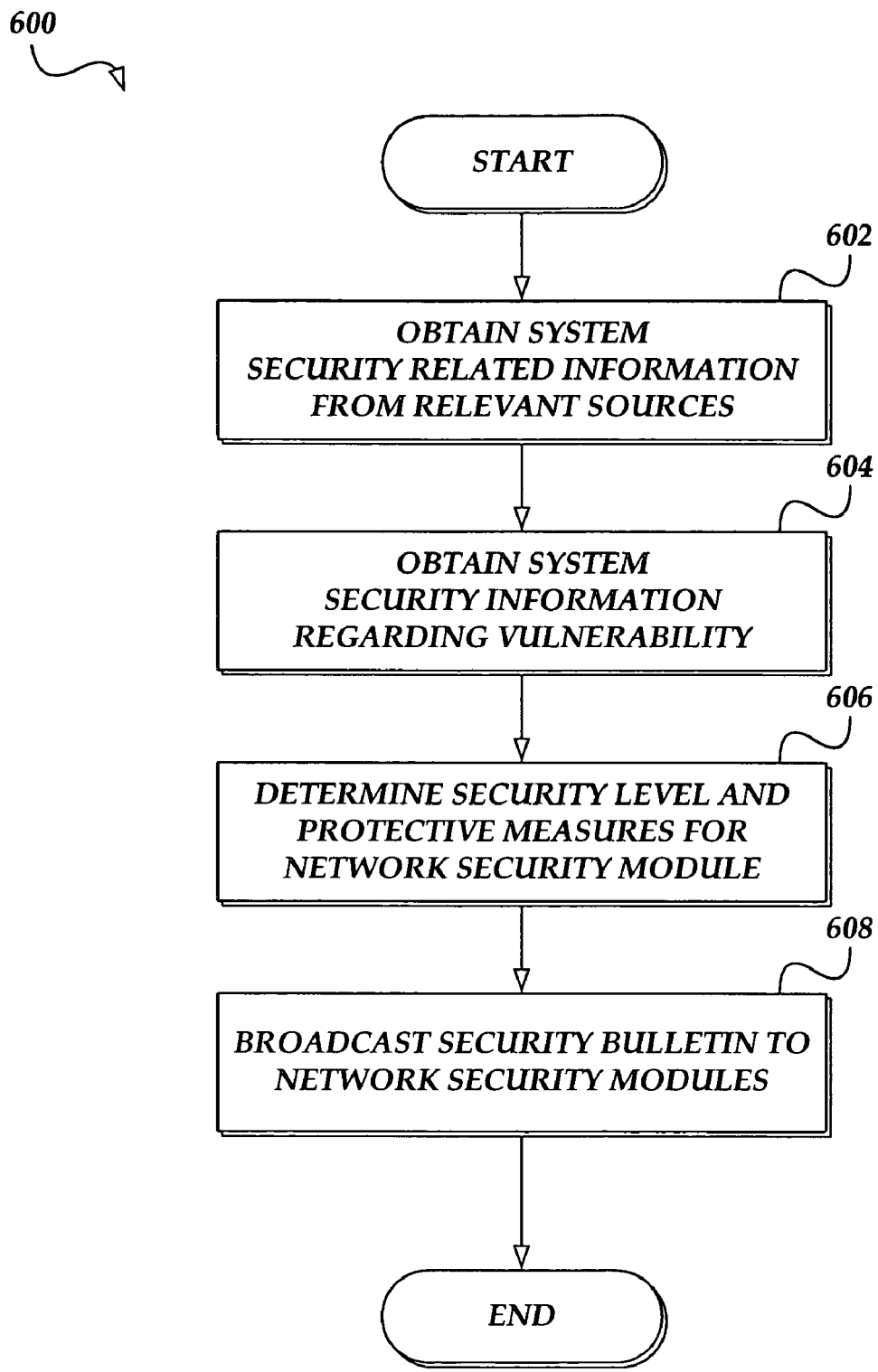
FIG. 6 is a flow diagram illustrating an exemplary routine implemented by a security service for publishing the security information for network security modules in the exemplary networked environment, in accordance with the present invention.

FIG. 6 is a flow diagram illustrating an exemplary routine 600 for broadcasting security information for network security modules, such as network security module 304, in the exemplary networked environment 300. Beginning at block 602, the security service 306 obtains security related information from a variety of sources. For example, the security service 306 would typically obtain information from operating system providers, anti-virus software providers regarding the latest revisions, patches, and updates available, as well as the computer exploits and/or vulnerabilities that are addressed via the various patches and updates. Other sources may also be polled for security related information, including various government agencies, security specialists, and the like.

At block 604, the security service 306 obtains information regarding a vulnerability of the computer systems connected to the network 110. This information may come from an operating system provider, an anti-virus software provider, or other party as the vulnerability is detected. At block 606, the security service 306, based on the threat posed by the vulnerability, determines a security level, e.g., red, yellow, or green, as well as protective security measures to be implemented by the network security modules, such as network security module 304, to secure the affected computers from an attack by a computer exploit on the vulnerability.

At block 606, the security service 306 broadcasts a security bulletin, comprising the security level and corresponding protective security measures, to the network security modules attached to the network 110, as described above. As discussed above, the security service 306 may broadcast the security bulletin by issuing a network-wide broadcast to all network security modules. This network-wide broadcast may be over the network 110, optionally using the guaranteed delivery option described above, or over a second communication link 314 to the network security devices in the networked environment 300. After broadcasting the security bulletin, the routine 600 terminates.

Figure 7:
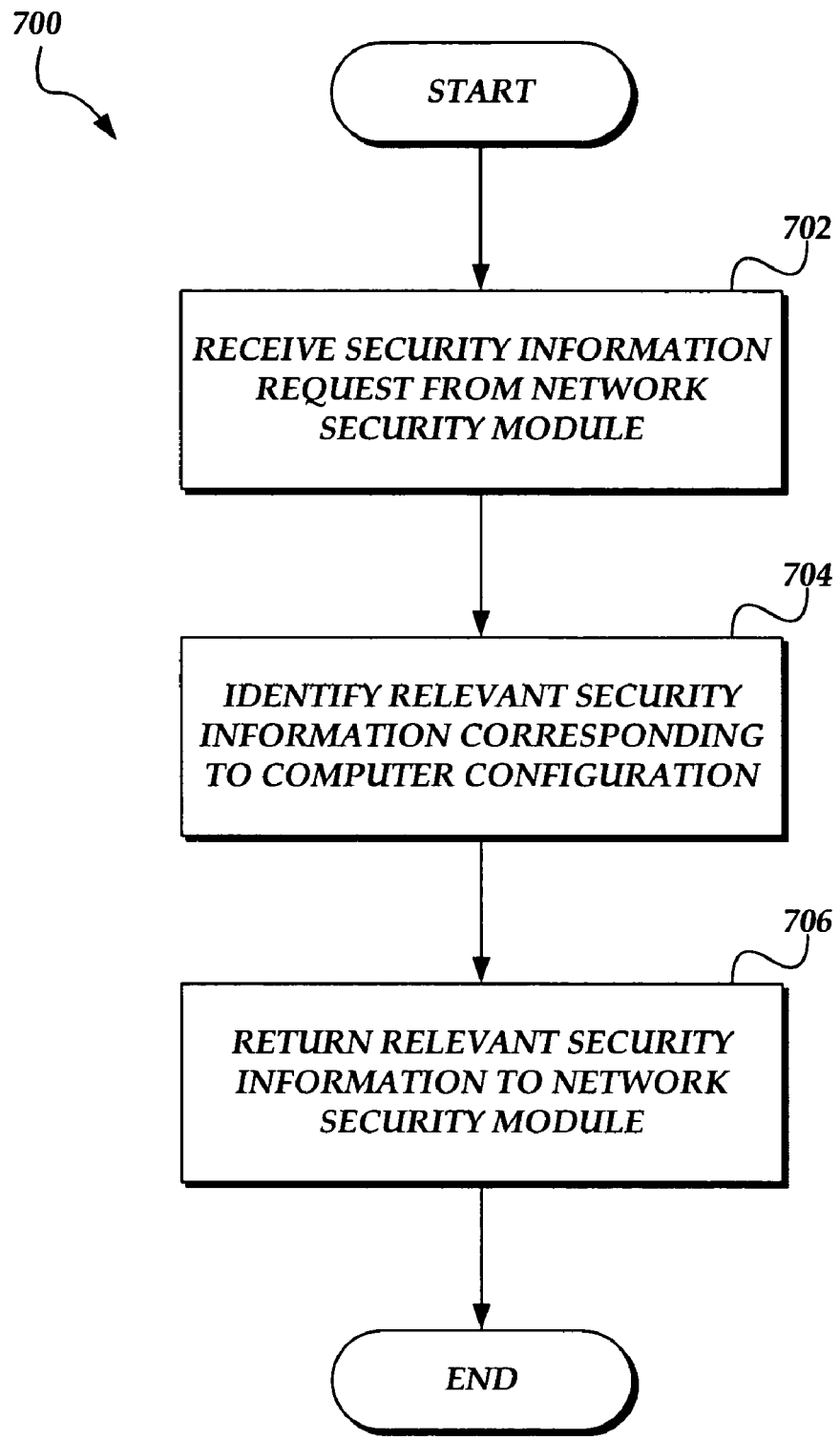
FIG. 7 is a flow diagram illustrating an exemplary routine implemented by a security service to receive and respond to a request for security information from a network security module.

FIG. 7 is a flow diagram illustrating an exemplary routine 700 implemented by a security service 306 to receive and respond to a security information request from a network security module 304. Beginning at block 702, the security service 306 receives a security information request from a network security device 304. As already mentioned, the security information request may include information corresponding to the computer's current configuration.

At block 704, according to the particular computer's configuration information in the security information request provided by the network security module, the security service 306 identifies relevant security information corresponding to the computer's current configuration information in the security information request.

According to one embodiment, the security service 306 identifies the relevant security information by determining protective security measures needed to protect the computer 302 according to the computer's configuration information. According to an alternative embodiment, the security service 306 identifies the relevant security information by returning all security information corresponding to the particular computer's configuration for further processing by the network security module to determine which protective security measures should be implemented. As yet a further alternative, the security service 306 identifies the relevant security information by returning all security information corresponding to the particular computer's configuration which is then forwarded to the computer 302 from the network security device such that the computer can inform the network security module which protective security measures to implement. Combinations of the above described alternatives may also be utilized, as well as other systems. Accordingly, the present invention should not be construed as limited to any one particular embodiment.

At block 706, the security service 306 returns the relevant security information to the requesting network security module 304. Thereafter, the routine 700 terminates.

Figure 8:
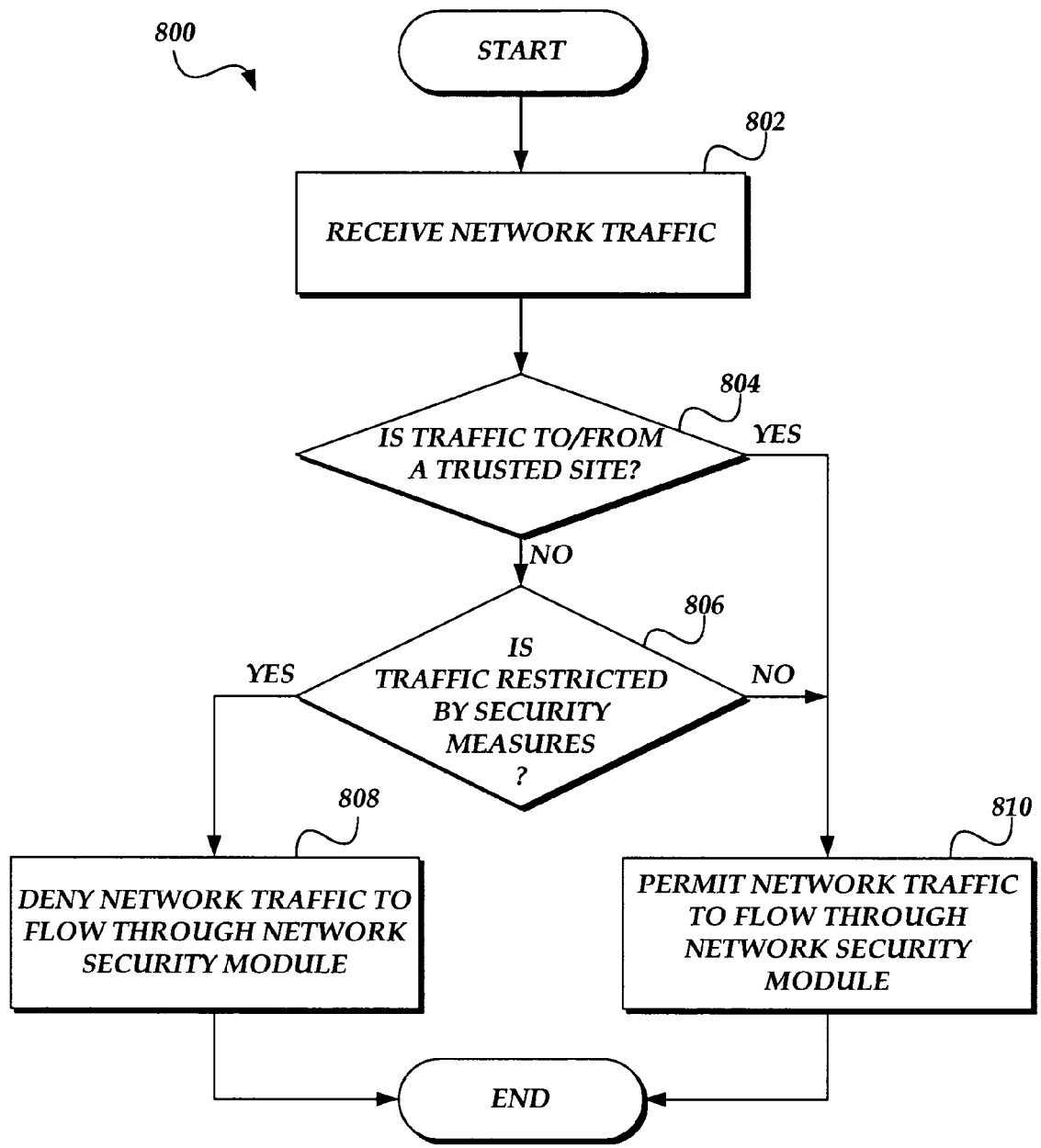
FIG. 8 is a flow diagram illustrating an exemplary method implemented by a network security module, for controlling the flow of network traffic between a computer and the network according to security measures obtained from the security service.

FIG. 8 is a flow diagram illustrating an exemplary method 800 implemented by a network security module 304, for controlling the flow of network traffic between a computer 302 and the network according to security measures obtained from the security service 306. Beginning at block 802, the network security module 304 receives network traffic, including both network traffic coming to the computer 302, as well as network traffic originating with the computer.

At decision block 804, a determination is made as to whether the network traffic is to or from a trusted network site, such as the security service, an anti-virus software provider, an operating system provider, and the like. If the network traffic is to or from a trusted network site, the routine proceeds to block 810 where the network traffic is permitted to flow through the network security module 304, and the routine 800 subsequently terminates. However, if the network traffic is not to or from a trusted network site, the routine proceeds to decision block 806.

At decision block 806, another determination is made as to whether the network traffic is restricted according to the currently implemented security measures. If the network traffic is not restricted according to the currently implemented security measures, the routine proceeds to block 810, where the network traffic is permitted to flow through the network security module 304, and the routine 800 subsequently terminates. However, if the network traffic is restricted according to the currently implemented security measures, the routine proceeds to block 808, where the network traffic is not permitted to flow through the network security module 304. Thereafter, the routine 800 terminates.

While the network security module 304 is interposed between the computer 302 and the Internet 110, the actual embodiment of the network security module may vary. According to the embodiment illustrated in FIG. 3, the network security module 304 may be implemented as a hardware device, external to the computer 302, with connections to the Internet 110 and to the computer 302. However, the present invention should not be construed as limited to this embodiment. As an alternative (not shown), the network security module 304 may be a component integrated as a component within the computer 302, or as a sub-component within the computer's network interface. These two embodiments may be especially useful when the computer 302 is connected to the Internet 110 via a wireless connection. Accordingly, the network security module 304 should not be construed as limited to any particular embodiment.

While the preferred embodiment of the invention has been illustrated and described, it will be appreciated that various changes can be made therein without departing from the spirit and scope of the invention.

The invention claimed is:

1. A network security system having a processor, a memory, and a storage medium storing computer executable instructions operative for protecting computing devices connected to a communication network from an identified security threat, the network security system comprising:

a network security module interposed directly between all computing devices and the communication network such that the network security module selectively controls network activities between the computing devices and the communication network, and the network security module communicating with a security service module through the communication network, wherein the network security module is operable to receive information about a current configuration of a corresponding computing device from the computing device and to send a security information request based on the received current configuration information for the computing device through the communication network to a security service module, and wherein when the network security module is powered up, the network security module is configured to enter into a full lock-down state such that network activities between the computing devices and only trusted network locations are permitted; and the security service module, which is separate from the network security module and connected to the communication network, that receives the security information request that is based on the current configuration information of the corresponding computing device from the network security module and publishes security information for the network security module based on the security information request of the network security module, the security information comprising security measures that are based on the current configuration of the computing device, which, when implemented by the network security module, protect the computing device from an identified security threat to and from other computing devices connected to the communication network, wherein the security service module is configured to publish security bulletins over the communication network by a general broadcast.

2. The network security system of claim 1, wherein the security measures include blocking all network access between the computing device and the communication network except network activities between the computing device and trusted communication network locations.

3. The network security system of claim 2, wherein the security measures include selectively blocking network activities between the computing device and the communication network that involve a range of communication ports corresponding to the network activity's source and/or destination.

4. The network security system of claim 3, wherein the security measures include blocking network activities between a code module executing on the computing device and the communication network.

5. The network security system of claim 4, wherein the security information further comprises a security level, and wherein the security level corresponds to the security measures in the security information based on the current configuration of the computing device.

6. The network security system of claim 5, wherein the security information further comprises an operating system revision value, the operating system revision value identifying the latest available operating system revision for the computing device.

7. The network security system of claim 6, wherein the security information further comprises an anti-virus software revision value, the anti-virus software revision value identifying the latest available anti-virus software revision for the computing device.

8. The network security system of claim 1, wherein the security service module, in response to a security request identifying an operating system revision value of the current revision of the operating system on the computing device, returns a security response comprising security measures for protecting the computing device from known security threats according to the current revision of the operating system on the computing device.

9. The network security system of claim 8, wherein the security information request further identifies an anti-virus software revision value of the current anti-virus software revision on the computing device, and wherein the security response comprises security measures for protecting the computing device from known security threats according to the current revision of the operating system and the anti-virus software on the computing device.

10. The network security system of claim 1, wherein the security service module publishes the security information by storing the security information on a trusted location connected to the communication network and separate from the security service module.

11. The network security system of claim 1, wherein the security service module publishes the security information by broadcasting the security information over a second communication link apart from the communication network.

12. The network security system of claim 11, wherein the second communication link is a satellite communication link.

13. The network security system of claim 11, wherein the second communication link is a radio frequency communication link.

14. The network security system of claim 1, wherein the security service module publishes the security information over the communication network using a guaranteed delivery service.

15. A method for securing computing devices in a communication network from an identified security threat delivered over the communication network, the method comprising:

receiving configuration information from each network security module through the communication network regarding a current configuration of each corresponding computing device, wherein each network security module in the communication network is interposed directly between each corresponding computing device and the communication network such that the network security module selectively controls network activities between the computing device and the communication network, wherein when each network security module is powered up, the network security module enters into a full lock-down state such that network activities between each computing device and only trusted network locations are permitted;

obtaining information by a security service relating to the identified security threat to each computing device in the communication network, wherein the information is based on the configuration information regarding the current configuration of each computing device received from each network security module, the security service communicating with each network security module through the communication network;

publishing security information relating to the identified security threat to network security modules in the communication network, wherein the security information includes protective security measures based on the received configuration information regarding a current configuration of each computing device, which, when enforced by a network security module, secure at-risk network activities between the computing device and the communication network from the identified security threat; and broadcasting security bulletins over the communication network.

16. The method of claim 15, wherein the protective security measures include blocking all network access between the computing device and the communication network except network activities between the computing device and trusted communication network locations.

17. The method of claim 15, wherein the protective security measures include selectively blocking network activities between the computing device and the communication network that involve a range of communication ports corresponding to the network activity's source and/or destination.

18. The method of claim 15, wherein the protective security measures include blocking network activities between a code module executing on the computing device and the communication network.

19. A non-transitory computer readable medium having computer-executable instructions which, when executed, carry out a method for securing computing devices in a communication network from an identified security threat delivered over the communication network, the method comprising:

receiving configuration information from network security modules through the communication network regarding a current configuration of each corresponding computing device;

obtaining information by a security service relating to the identified security threat to each computing device in the communication network, wherein the information is based on the received configuration information regarding a current configuration of each computing device, the security service communicating with all network security modules through the communication network, and wherein when each network security module is powered up, the network security module enters into a full lock-down state such that network activities between each computing device and only trusted network locations are permitted;

publishing a security information relating to the identified security threat to network security modules in the communication network, wherein each network security module in the communication network is interposed directly between a computing device and the communication network such that the network security module selectively controls network activities between the computing device and the communication network, and wherein the security information includes protective security measures based on the received current configuration information of each computing device which, when enforced by a network security module, secure at-risk network activities between the computing device and the communication network from the identified security threat; and broadcasting security bulletins over the communication network.

20. A network security system having a processor, a memory, and a storage medium storing computer executable instructions operative for protecting computing devices connected to a communication network from a network-delivered security threat, the network security system comprising:

a security service module connected to the communication network that obtains information relating to a network-delivered security threat to all computing devices based on a current configuration of each computing device, and publishes security information including protective security measures corresponding to network activities between each computing device and the communication network based on the current configuration of the computing device which, if implemented, protect the computing device from the network-delivered security threat, and wherein the security service module is configured to publish security bulletins over the communication network by a general broadcast; and a network security module separate from the security service module and interposed directly between all computing devices and the communication network such that the network security module selectively controls network activities between the computing devices and the communication network, and the network security module communicating with the security service module through the communication network and providing current configuration information for the computing device to the security service module, wherein the network security module obtains the security bulletin published by the security service module based on the current configuration of the computing device and selectively implements the protective security measures corresponding to the current configuration of the computing device thereby securing the computing device from the network-delivered security threat, and wherein when the network security module is powered up, the network security module is configured to enter into a full lock-down state such that network activities between the computing devices and only trusted network locations are permitted.

21. The network security system of claim 1, wherein the current configuration information comprises information regarding executable code installed on the computing device.

22. The network security system of claim 1, wherein the communication network is a wide area network.

23. The method of claim 15, wherein securing computing devices in a communication network from an identified security threat delivered over the communication network comprises securing the computing devices in a wide area network from the identified security threat delivered over the wide area network.

24. The non-transitory computer readable medium of claim 19, wherein the method for securing computing devices in a communication network from the identified security threat delivered over the communication network comprises securing the computing devices in a wide area network from the identified security threat delivered over the wide area network.

25. The network security system of claim 20, wherein the communication network is a wide area network.

* * * * *